May 26, 1931.  F. G. BEUTNER  1,806,582
PORTABLE ELECTRIC SAW
Filed Nov. 7, 1929
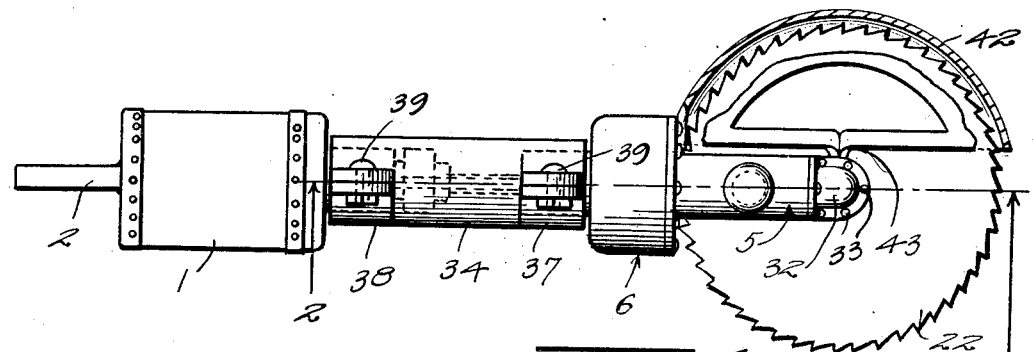
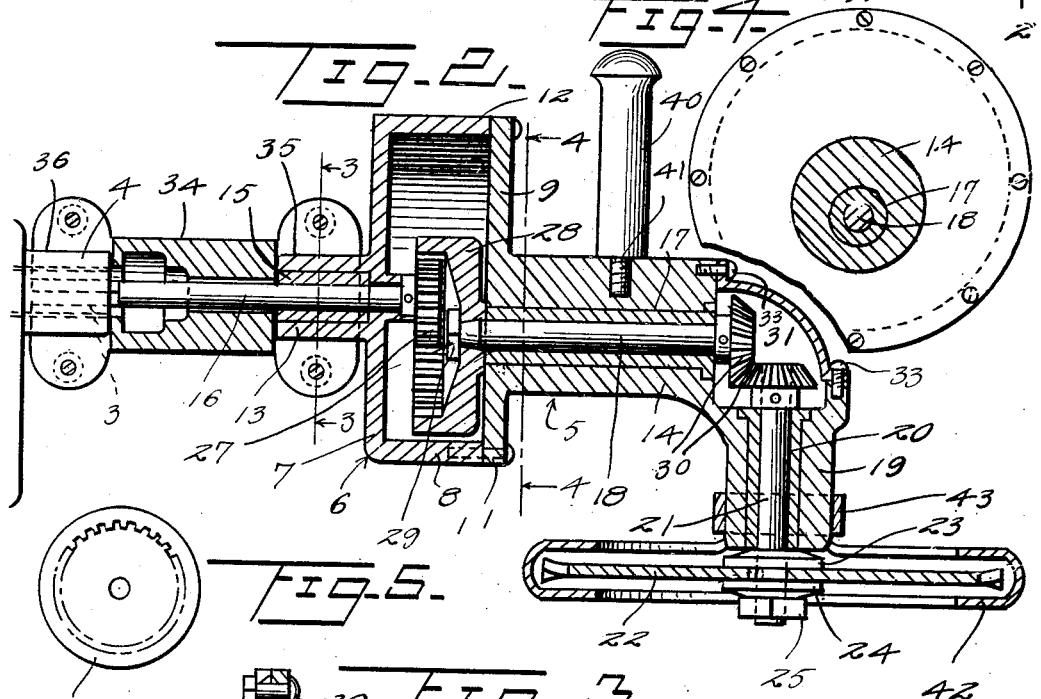
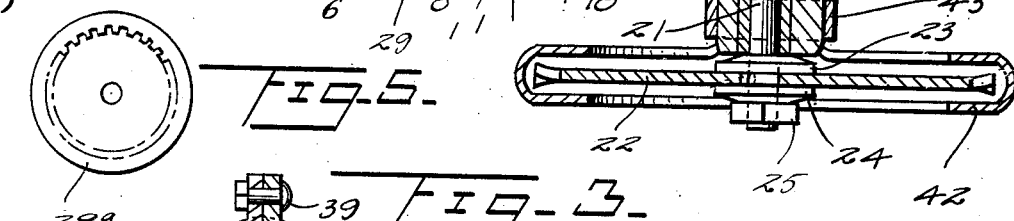
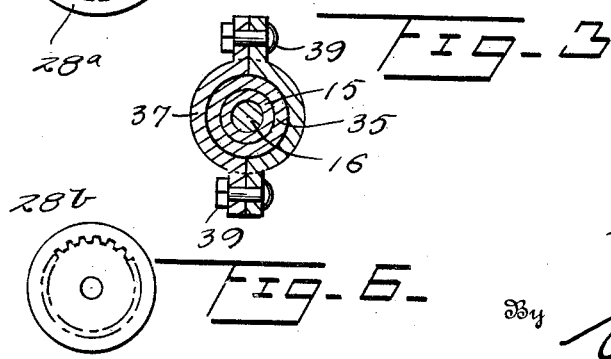
Inventor
F. G. Beutner
By Watson E. Coleman
Attorney Patented May 26, 1931

1,806,582

UNITED STATES PATENT OFFICE

FRED G. BEUTNER, OF WHITE LAKE, SOUTH DAKOTA

PORTABLE ELECTRIC SAW

Application filed November 7, 1929. Serial No. 405,397.

This invention relates to a portable rotary saw, and has for one of its objects to provide a novel, simple and highly efficient device of this character which may be readily adapted to be used for the purpose of cutting iron or wood and which shall be adapted to be readily connected to the chuck of any electric drill.

The invention has for a further object to provide a saw of the character stated which shall embody an arbor to which a wood or metal cutting saw blade of any desired or required size may be readily secured, a main shaft adapted to be connected to the armature shaft of the motor of the electric drill, a counter-shaft geared to the arbor, and gears connecting the main and counter-shafts and adapted to be readily interchangeable to permit the saw blade to be driven at the desired or required speed.

The invention has for a further object to provide a saw of the character stated which shall embody a housing consisting of a cylindrical casing for the gears connecting the main and counter-shafts, a sleeve extending eccentrically and rearwardly from the rear wall of the casing and adapted to support the main shaft, a sleeve extending forwardly and eccentrically from the front wall of the casing and adapted to support the counter-shaft, and a sleeve extending laterally from the front end of the counter-shaft sleeve and adapted to support the arbor.

The invention has for a further object to provide a saw of the character stated wherein the main and counter-shaft sleeves shall be arranged in radially offset relation and wherein the rear and front walls of the casing shall be connected together for angular relative adjustment in parallel planes, to the end that the radial distance between the main and counter-shafts may be varied to adapt such shafts to be connected by gear sets of different ratios.

The invention has for a still further object to provide a saw of the character stated which shall embody a coupling adapted to secure the saw housing to the motor housing of the electric drill and adapted to permit the saw housing to be turned about the axis of the electric drill so as to arrange the saw in any desired or required angular position with respect to the plane in which the handle of the electric drill is located.

The invention is hereinafter more fully described and claimed, and illustrated in the accompanying drawings, wherein:—

Figure 1 is a view in side elevation of the saw connected to the motor housing of an electric drill;

Figure 2 is a sectional view on an enlarged scale taken on the plane indicated by the line 2—2 of Figure 1;

Figure 3 is a sectional view taken on the plane indicated by the line 3—3 of Figure 2;

Figure 4 is a sectional view taken on the plane indicated by the line 4—4 of Figure 2, and Figures 5 and 6 are elevational views of gears that differ in size from each other and from the gear shown in Figure 2 and one of which is adapted to be used in place of the gear of Figure 2.

Referring in detail to the drawings, 1 designates the motor housing, 2 the handle and 3 the bit chuck of an electric drill of well known construction. The chuck 3 is secured to the armature shaft of the motor of the drill, and is rotatably arranged within a boss 4 extending from the front end of the housing 1.

The portable saw comprises a housing 5 which includes a casing 6 of cylindrical formation and having its rear wall 7 and lateral wall 8 formed integrally. The front wall 9 of the casing 6 is connected to the lateral wall 8 for adjustment angularly with respect to the rear wall 7 and in a plane parallel to the plane of the rear wall. The front wall 9 is secured to the lateral wall 8 by screws 10 which pass through openings 11 in the front wall and engage in sockets 12 in the lateral wall.

A sleeve 13 is formed integrally with and extends rearwardly from the casing wall 7, and a sleeve 14 is formed integrally with and extends forwardly from the casing wall 9. The sleeves 13 and 14 are eccentrically arranged on the casing walls 7 and 9, respectively, and they are arranged in axially offset relation with respect to each other. The angular adjustibility of the casing wall 9 with respect to the casing walls 7 permits the radial distance between the axes of the sleeves 13 and 14 to be varied. The sleeve 13 is provided with a bushing 15 and rotatably supports a main shaft 16. The sleeve 14 is provided with a bushing 17 and rotatably supports a counter-shaft 18.

A sleeve 19 is formed integrally with and extends laterally from the front end of the sleeve 14. The sleeve 19 is provided with a bushing 20 and rotatably supports an arbor 21. A circular saw blade 22 is mounted upon the arbor 21 between an inner collar 23 and an outer collar 24. The saw blade 22 is held against rotation with respect to the arbor 21 by a nut 25 which turns up on the arbor in a direction reverse to that of the rotation of the arbor.

The main shaft 16 and the counter-shaft 18 are connected together by a pinion 27 fixed to the main shaft and an internal gear 28 removably secured to the counter-shaft by a nut 29. The gears 27 and 28 are arranged within the casing 6 which, in practice, will be packed with grease. The counter-shaft 18 and arbor 24 are connected by beveled pinions 30 which are arranged within a chamber 31 formed in the adjacent ends of the sleeves 14 and 19. The chamber 31 is provided with a cap plate 32 which is removably secured in place by screws 33, and this chamber will also, in practice be packed with grease.

The housing 5 is secured to and supported from the boss 4 of the housing 1 by a coupling 34 which is provided with terminal recesses 35 and 36 for the reception of the sleeve 13 and boss 4, respectively. The recesses 35 and 36 are provided with removable cap plates 37 and 38, respectively, to permit the coupling 34 to be readily engaged with the sleeve 13 and boss 4. The cap plates 37 and 38 are secured to the coupling 34 by bolts 39. The main shaft 6 extends through the coupling 34 and is engaged with the chuck 3 of the electric drill.

The saw blade 22 is arranged forwardly beyond the electric drill and at one side of the axis thereof. The housing 5 is rotatably associated with the coupling 34 to permit the saw blade 22 to be arranged in a plane parallel to or angularly related to the plane in which the handle 2 is rotated, it being understood that the handle is in the form of a loop and the plane in which it is located extends across the casing 1. The handle 2 carries the switch, not shown, for the motor of the drill. In order to permit the ready adjustment of the saw blade 2 and to permit the saw blade to be maintained in its adjusted position, a handle 40 is provided. The handle 40 is connected, as at 41, to the sleeve 14 and extends right angularly from the sleeve.

The pinion 27 and gear 28 effect the rotation of the saw blade 22 at a rate lower than that of the armature shaft of the electric drill. By substituting a gear 28ª shown in Figure 5, for the gear 28, the saw blade 22 will be rotated at a lower rate, and by substituting a gear 28ᵇ shown in Figure 6 for the gear 28, the saw blade 22 will be rotated at a still lower rate. As the casing wall 9 is removably secured in applied position, and as the gear 28 is removably secured to the counter-shaft 18, this substitution of gears may be easily and quickly accomplished. The angular adjustment of the casing wall 9 with respect to the casing wall 7 permits the radial distance of the main shaft 16 and counter-shaft 18 to be varied to accommodate the diameter of the gear used.

The saw blade 22 is provided with a guard 42 which surrounds the upper side thereof and is secured to the sleeve 19 by a clamp 43.

It should be apparent from the foregoing description, taken in connection with the accompanying drawings, that a metal or wood cutting saw blade of any size may be easily and quickly secured to the arbor 21, that the gearing between the main shaft 16 and the counter-shaft 18 may be readily varied to drive the saw blade at the desired or required speed with respect to the speed of the armature shaft of the electric drill, that the saw may be readily connected to the electric drill, and that the saw blade may be readily adjusted into the required angular position with respect to the handle of the electric drill.

It will also be apparent that the saw may be used by machinists, boiler-makers, metal-workers, cabinet-makers, carpenters and the like, and that if desired, the portable rotary saw may be equipped with a set of wood cutting blades and a set of iron cutting blades of different sizes. The iron cutting blades may be of the hack saw type.

While I have described the principle of the invention, together with the device which I now consider the preferred embodiment thereof, it is to be understood that the device shown is merely illustrative and that such changes may be made, when desired, as fall within the scope of the invention as claimed.

I claim:—

1. A portable saw, comprising a casing having parallel front and rear walls, means connecting the walls for relative angular adjustment, a front bearing sleeve arranged eccentrically on the front wall and extending forwardly therefrom, a rear bearing sleeve arranged eccentrically on the rear wall and extending rearwardly therefrom, the bearing sleeves being arranged with their axes in radially offset relation and the bearing sleeves being adjustable with the front and rear walls, so that the distance between said axes may be varied, a main shaft journaled in the rear bearing sleeve, a counter-shaft journaled in the front bearing sleeve, a pinion arranged within the casing and secured to the main shaft, a gear arranged within the casing and removably secured to the counter-shaft and meshing with the pinion, an arbor, means rotatably supporting the arbor from the front bearing sleeve, gears connecting the counter-shaft and arbor, and a blade secured to the arbor.

2. A portable saw, comprising a casing having parallel front and rear walls, means connecting the walls for relative angular adjustment, a front bearing sleeve arranged eccentrically on the front wall and extending forwardly therefrom, a rear bearing sleeve arranged eccentrically on the rear wall and extending rearwardly therefrom, the bearing sleeves being arranged with their axes in radially offset relation and the bearing sleeves being adjustable with the front and rear walls so that the distance between said axes may be varied, a main shaft journaled in the rear bearing sleeve, a counter-shaft journaled in the front bearing sleeve, a pinion arranged within the casing and secured to the main shaft, a gear arranged within the casing and removably secured to the counter-shaft and meshing with the pinion, a bearing sleeve carried by the front end of the front bearing sleeve and extending angularly therefrom, an arbor journaled in said last bearing sleeve, gears connecting the counter-shaft and arbor, and a blade secured to the arbor.

3. A portable saw, comprising a casing having parallel front and rear walls, means connecting the walls for relative angular adjustment, a front bearing sleeve arranged eccentrically on the front wall and extending forwardly therefrom, a rear bearing sleeve arranged eccentrically on the rear wall and extending rearwardly therefrom, the bearing sleeves being arranged with their axes in radially offset relation and the bearing sleeves being adjustable with the front and rear walls so that the distance between said axes may be varied, a main shaft journaled in the rear bearing sleeve, a counter-shaft journaled in the front bearing sleeve, a pinion arranged within the casing and secured to the main shaft, a gear arranged within the casing and removably secured to the counter-shaft and meshing with the pinion, a bearing sleeve carried by the front end of the front bearing sleeve and extending angularly therefrom, an arbor journaled in said last bearing sleeve, gears connecting the counter-shaft and arbor, a blade secured to the arbor, the main shaft extending rearwardly beyond the rear bearing sleeve, and a coupling secured to and extending rearwardly from the rear bearing sleeve and surrounding the extended portion of the main shaft.

In testimony whereof I hereunto affix my signature.

FRED G. BEUTNER.